United States Patent
Kratzer

(10) Patent No.: US 7,467,780 B2
(45) Date of Patent: Dec. 23, 2008

(54) ELECTROMAGNETIC VALVE, PARTICULARLY FOR A BRAKING SYSTEM OF A MOTOR VEHICLE

(75) Inventor: Dietmar Kratzer, Tamm (DE)

(73) Assignee: Robert Bosch GmbH, Stuttgart (DE)

(*) Notice: Subject to any disclaimer, the term of this patent is extended or adjusted under 35 U.S.C. 154(b) by 118 days.

(21) Appl. No.: 10/556,594

(22) PCT Filed: Dec. 13, 2004

(86) PCT No.: PCT/EP2004/053413

§ 371 (c)(1),
(2), (4) Date: Nov. 14, 2005

(87) PCT Pub. No.: WO2005/066531

PCT Pub. Date: Jul. 21, 2005

(65) Prior Publication Data

US 2007/0001142 A1  Jan. 4, 2007

(30) Foreign Application Priority Data

Jan. 10, 2004 (DE) .................. 10 2004 001 565

(51) Int. Cl.
*F16K 31/02* (2006.01)

(52) U.S. Cl. .................. 251/129.02; 251/129.15; 335/304

(58) Field of Classification Search ............ 251/129.02, 251/129.15; 335/296, 302, 304
See application file for complete search history.

(56) References Cited

U.S. PATENT DOCUMENTS

| 5,503,364 | A | * | 4/1996 | Enomoto et al. ....... 251/129.02 |
| 5,603,483 | A | * | 2/1997 | Reuter et al. ........... 251/129.02 |
| 5,931,179 | A | * | 8/1999 | Megerle et al. .......... 137/15.17 |
| 5,984,263 | A | | 11/1999 | Hosoya |
| 6,086,164 | A | * | 7/2000 | Oehler et al. ............. 303/119.2 |
| 6,254,199 | B1 | * | 7/2001 | Megerle et al. .......... 303/119.2 |
| 6,439,265 | B1 | * | 8/2002 | Gruschwitz et al. .... 137/601.14 |
| 6,453,936 | B1 | * | 9/2002 | Frank et al. ............. 137/315.03 |
| 6,471,305 | B1 | * | 10/2002 | Leventhal et al. ........ 303/119.2 |
| 6,945,510 | B2 | * | 9/2005 | Dralyuk ................. 251/129.15 |
| 7,134,640 | B2 | * | 11/2006 | Koeder et al. .......... 251/129.15 |

FOREIGN PATENT DOCUMENTS

| DE | 88 13 280 U1 | 2/1990 | |
| DE | 197 00 495 A1 | 7/1997 | |
| DE | 10359174 | * 12/2007 | ............ 251/129.15 |
| EP | 1 101 680 A1 | 5/2001 | |

* cited by examiner

Primary Examiner—John K Fristoe, Jr.
(74) Attorney, Agent, or Firm—Ronald E. Greigg

(57) ABSTRACT

An electromagnetic valve is provided with an elongated tappet guided axially displaceably in a tappet guide, and with a sealing body, embodied on the tappet, that can seal against a sealing seat. So that the valve can be produced more economically yet can be regulated more precisely, the sealing seat and the tappet guide are embodied in one piece. The adjustability of the valve is assured in particular by an adjusting ring.

15 Claims, 4 Drawing Sheets

ELECTROMAGNETIC VALVE, PARTICULARLY FOR A BRAKING SYSTEM OF A MOTOR VEHICLE

CROSS-REFERENCE TO RELATED APPLICATIONS

This application is a 35 USC 371 application of PCT/EP 2004/053413 filed on Dec. 13, 2004.

BACKGROUND OF THE INVENTION

1. Field of the Invention

The invention relates to an electromagnetic valve, in particular for a brake system of a motor vehicle, having an elongated tappet, which is guided axially displaceably in a tappet guide, and having a sealing body, embodied on the tappet, that can seal against a sealing seat.

2. Description of the Prior Art

In known brake systems, electromagnetic valves are used particularly as inlet or switchover valves, in order to furnish anti-lock, traction control or electronic stability program functions for brakes of an associated motor vehicle. Known electromagnetic valves have an elongated tappet, which is guided axially displaceably in a substantially hollow-cylindrical tappet guide. A likewise hollow-cylindrical sealing seat is press-fitted into the hollow-cylindrical tappet guide, and a sealing body located on one end of the tappet can then strike this sealing seat and hence provide sealing. The press-fitting of the sealing seat into the tappet guide can change the geometry of the entire arrangement for adapting and adjusting the desired valve function. In particular, when the sealing seat is open, an existing air gap in the axial direction between the tappet and the tappet guide can be adjusted.

With such an open sealing seat, an operating medium, such as a brake fluid, flows through the sealing seat into the interior of the tappet guide, where after a deflection by an angle of 180° it is then fed onward, through as a rule three longitudinal grooves embodied in the tappet guide and six further radial grooves, then after a further deflection by an angle of 180° it is fed in the direction of a radial filter, and after flowing through the radial filter and after a final deflection by an angle of 90°, it is fed into the associated hydraulic unit of the electromagnetic valve.

OBJECTS AND SUMMARY OF THE INVENTION

The object of the invention is to furnish an electromagnetic valve, particularly for a brake system of a motor vehicle, which in comparison to known valves can be produced more economically and in particular can also be regulated better.

This object is attained according to the invention with an electromagnetic valve as described at the outset, in which the sealing seat and the tappet guide are embodied in one piece. The invention is based on the recognition that in known valves, their most important function, namely sealing and regulating pressure, are done with a sealing body and a sealing seat that are linked with one another via a comparatively large number of interfaces. Each of these interfaces involves dimensional, shape and positional tolerances, which impairs the replicability of the position of the tappet that is important for regulating pressure.

According to the invention, the number of interfaces between the sealing body and the sealing seat is reduced to a minimum, and in contrast to known electromagnetic valves, a plurality of components are combined into a single one. As a result, according to the invention, the number of unknowns are restricted, and the position of the tappet can be better reproduced. This improvement is expressed in every individual valve. It moreover gains in importance when a plurality of valves are controlled with adaptation to one another, as in brake systems today.

Despite this improvement, in the electromagnetic valve of the invention, the possibility of adjusting the sealing and pressure regulating functions is still preserved. In fact, as will be described in further detail below, in the valve of the invention geometric differences among parts can still be advantageously compensated for.

As noted, it is the nucleus of the invention that the sealing seat, or a valve body, is embodied in one piece with the tappet guide, or a valve insert. Based on this design according to the invention, the guide of the tappet can be made comparatively narrow, so that the tappet and its sealing body replicably strike in or on the sealing seat.

In an advantageous refinement of the electromagnetic valve of the invention, it is purposefully wanted, and that both the tappet guide and the tappet are accordingly designed, that the sealing body strikes the sealing seat centrally. Alternatively, this striking action can be purposefully done eccentrically. Both possibilities can be attained with the one-piece sealing seat-tappet guide component of the invention, at comparatively little effort or expense. In the valve of the invention, the location of the sealing seat can be machined especially precisely, particularly in the radial direction, inside the tappet guide. Therefore the position of the tappet and of its sealing body in proportion to the sealing seat in this radial direction is also comparatively precise.

In the tappet guide of the invention, an adjusting device is also advantageously provided, by means of which an air gap can be adjusted in the axial direction between the tappet and the tappet guide. With the adjusting device, tolerances in length of the aforementioned individual parts can be compensated for, and the width of the air gap, existing when the sealing seat is closed, between the sealing body and the sealing seat can be adjusted.

An adjusting device of this kind is especially advantageously designed as an adjusting ring, which is located particularly on the tappet guide. As a result, the tappet guide overall takes on a triple function, because it has the sealing seat, it guides the tappet, and it forms the basis for the adjusting device. In this way, the aforementioned air gap can be adjusted for instance by a simple displacement of the adjusting ring on the tappet guide.

Especially advantageously, the adjusting ring is fixed on the tappet guide with the aid of a radial compression. The radial compression can be embodied comparatively precisely and simply during the adjustment of the valve function, and the length ratios adjusted in the process no longer change in subsequent operation of the electromagnetic valve.

Alternatively or in addition, the adjusting device may be designed as an adjusting ring, which is fixed by means of a laser-welded seam, in particular on the jacket face of a substantially cylindrical tappet guide. The laser-welded seam assures a durable, fluid-tight and positionally accurate connection between the adjusting ring and the tappet guide.

A cap can advantageously be placed on the tappet guide and/or the adjusting ring and can then be fixed inexpensively on the adjusting ring by means of a further laser-welded seam. Once the cap is slipped onto the adjusting ring, the maximum deflection of the tappet in the tappet guide can be defined.

In an electromagnetic valve according to the invention embodied in this way, the magnetic flux passes from the tappet guide radially to the adjusting ring and from it axially into an armature, located on the tappet, of the valve. In the process, the adjusting ring as a rule does not take on any guide function for the tappet.

Advantages in the assembly of the parts of the tappet with its armature, the cap, and the adjusting ring are also obtained as a result of the one-piece sealing seat-tappet guide component provided according to the invention. Thus during assembly, the tappet stroke can be set by simply varying the relative position of the adjusting ring on the tappet guide by means of the radial compression. The air gap between the armature of the tappet and the adjusting ring can subsequently be adjusted by varying the relative position of the cap or capsule on the adjusting ring, again with the aid of a radial compression. Both relative positions and the tightness of the entire valve are then assured by the aforementioned double laser-welded seam. The electromagnetic valve of the invention can therefore be produced and assembled inexpensively. Moreover, there are advantages in terms of the regulatability of the valve.

A sealing seat is not press-fitted into the tappet guide of the invention, and thus the tappet guide need not absorb corresponding pressure forces and can optionally be embodied as comparatively thin in the region of the sealing seat. This saves material, weight and expenses. Moreover, at least one radial bore can advantageously be embodied on the tappet guide of the invention, in the region of the sealing seat, by which bore a fluid flowing through the sealing seat can be carried away to the outside of the tappet guide. In this outflow of the fluid, its flow is deflected only once, by an angle of 90°. The flow resistance is correspondingly reduced. Furthermore, the tappet guide then also takes on the function of "conducting the outflow", so that other components of the electromagnetic valve of the invention, which have previously taken on this function, can be embodied correspondingly more simply. For instance, a plastic insert, provided in known valves, on the side of the sealing seat facing away from the tappet can be designed correspondingly simply.

BRIEF DESCRIPTION OF THE DRAWINGS

Exemplary embodiments of an electromagnetic valve according to the invention are described in further detail below in conjunction with the accompanying schematic drawings. Shown are.

DETAILED DESCRIPTION OF THE PREFERRED EMBODIMENT

Figure 1:
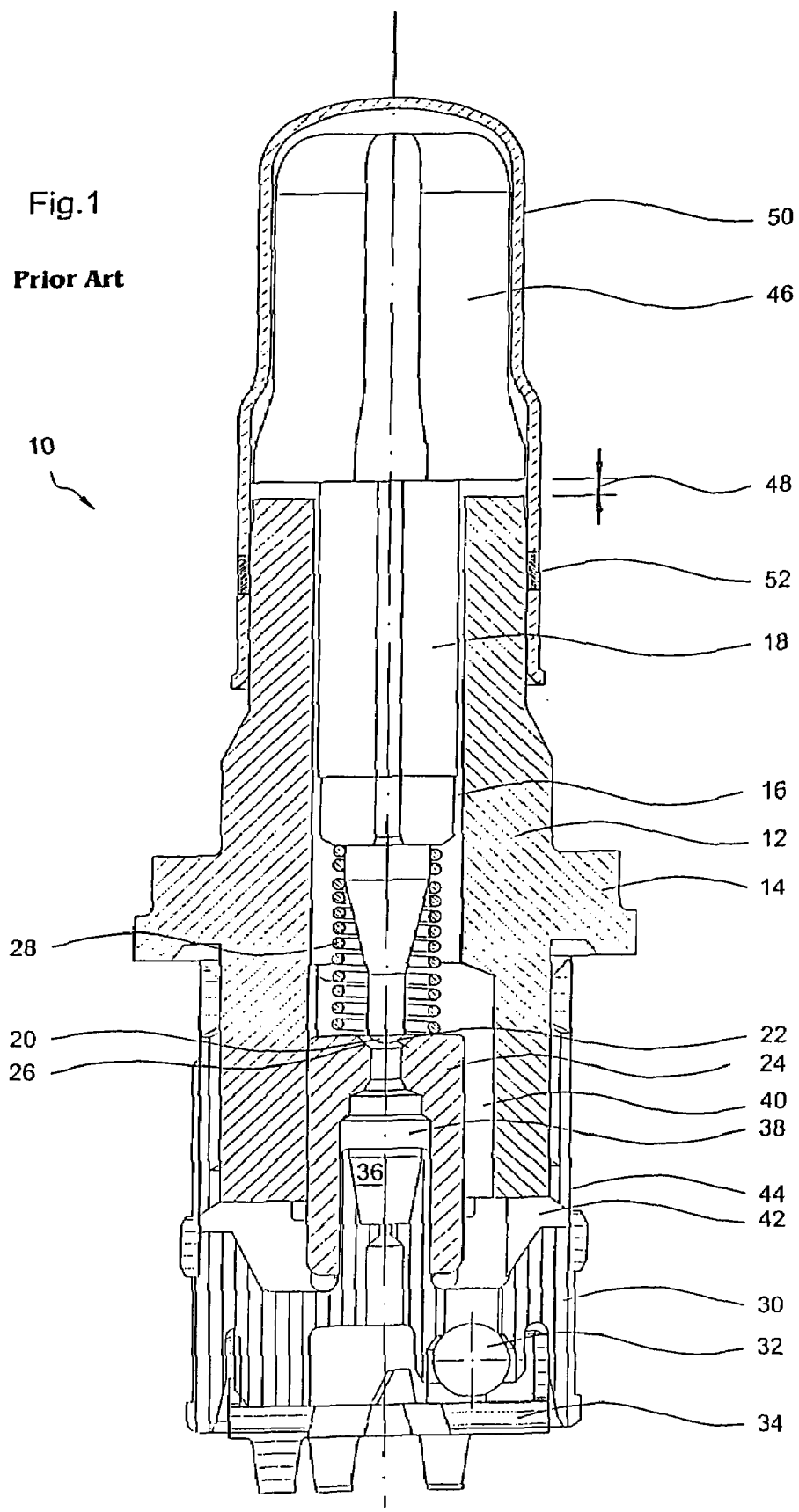
FIG. 1, a longitudinal section through an electromagnetic valve of the prior art.

In FIG. 1, an electromagnetic valve 10 of the prior art is shown. As its central component, the valve 10 has a substantially hollow-cylindrical tappet guide 12, or valve insert, on the outside of which a collar 14 is embodied approximately in the middle of its length and a through opening 16 is embodied in the longitudinal direction in the interior. In the through opening 16, a substantially circular-cylindrical tappet 18 is supported displaceably in the longitudinal direction of the tappet guide 12. On the lower end of the tappet 18, in terms of FIG. 1, a sealing body 20 is provided, which has a spherical-segment-shaped surface 22 that bulges downward.

Diametrically opposite the sealing body 20, there is a sealing seat 24 or sealing body which is designed essentially hollow-cylindrically and which has a frustoconical surface 26 opposite the spherical-segment-shaped surface 22. A spiral spring 28, which acts as a compression spring and is braced on the sealing seat 24, is thrust onto the lower part of the tappet 18, which—as can be seen from FIG. 1—is designed with a smaller diameter.

On the face end, facing away from this spiral spring 28, of the substantially hollow-cylindrical sealing seat 24, there is a virtually disk-shaped insert body 30, with a check ball valve 32 embodied eccentrically in it. A slightly cup-shaped axial filter 34 is located on the lower face end, in terms of FIG. 1, of this insert body 30.

A through bore 36 is embodied in the insert body 30, and a through bore 38 adjoining this through bore 36 is embodied in the longitudinal direction in the sealing seat 24. Through these through bores 36 and 38, a fluid operating medium or fluid delivered through the axial filter 34 can reach the conical-segment-shaped surface 26 of the sealing seat 24. In the operating state shown, the sealing body 20 does not rest on the sealing seat 24. The operating medium is therefore capable of getting into the chamber in and around the spiral spring 28, and from there it can flow out through one or more longitudinal grooves 40 embodied in the tappet guide 12, a plurality of radial grooves 42 embodied in the insert body 30, and a radial filter 44 located on the jacket face of the tappet guide 12.

So that this flow of operating medium through the sealing seat 24 can also be interrupted by the valve 10, the tappet 18, on its upward end portion in terms of FIG. 1, has an electromagnetic armature 46. This armature can be moved with the aid of an electromagnet, not shown, so that the tappet 18 is displaced in the tappet guide 12 and the spherical-segment-shaped surface 22 is guided toward the conical-segment-shaped surface 26.

In order to enable this motion of the tappet 18, an air gap 48 is embodied between the upper end face, in terms of FIG. 1, of the substantially hollow-cylindrical tappet guide 12 and the lower end face of the armature 46. A substantially cup-shaped cap 50 is also fitted over the armature 46 and is fixed on the outer jacket face of the tappet guide 12 with the aid of a circumferential welded seam 52.

Figure 2:
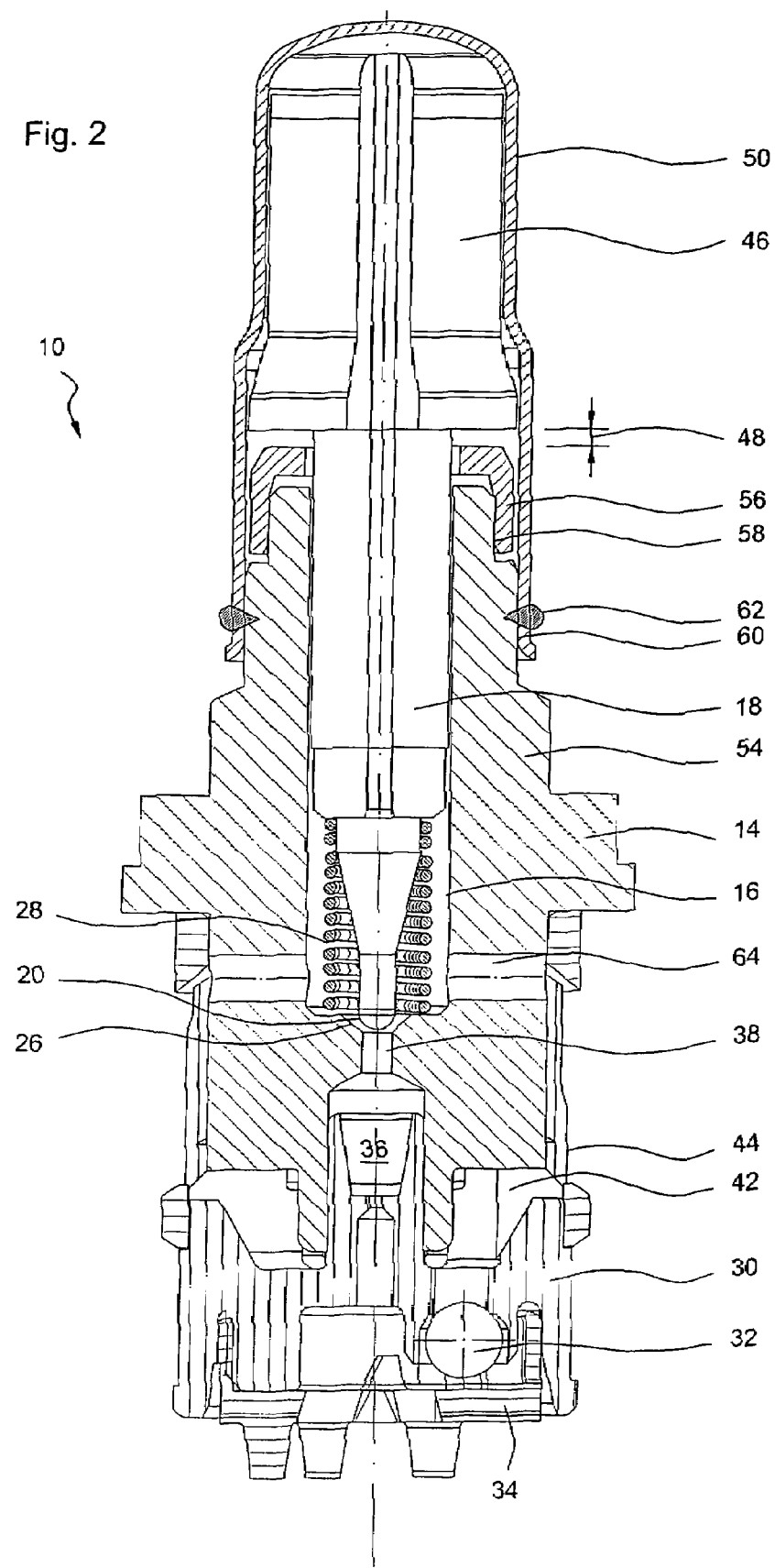
FIG. 2, a longitudinal section through a first exemplary embodiment of an electromagnetic valve of the invention.

In FIG. 2, an exemplary embodiment of an electromagnetic valve 10 of the invention is shown. In contrast to the valve 10 shown in FIG. 1, the valve of FIG. 2 has a one-piece sealing seat-tappet guide component 54, which takes on both the function of a tappet guide and the function of a sealing seat.

As a further innovation compared to the valve 10 shown in FIG. 1, the valve 10 of FIG. 2, in the upper end region in terms of FIG. 2, has an adjusting ring 56 of L-shaped cross section, which is fixed on the tappet guide 12 with the aid of a press fit or radial compression 58. The adjusting ring 56 has no guidance function for the tappet 18 and instead serves to adjust the air gap 48, which now, in the valve 10 of FIG. 2, is formed between the upper end face of the adjusting ring 56 and the lower end face of the armature 46.

In the valve 10 of FIG. 2, a cap 50 is fitted over the adjusting ring 56 and the upper region, in terms of FIG. 2, of the tappet guide 12; it is firmly slipped onto the tappet guide 12 with the aid of a press fit or radial compression 60 and is then fixed on the outer circumference of the tappet guide 12 with a laser-welded seam 62.

Figure 3:
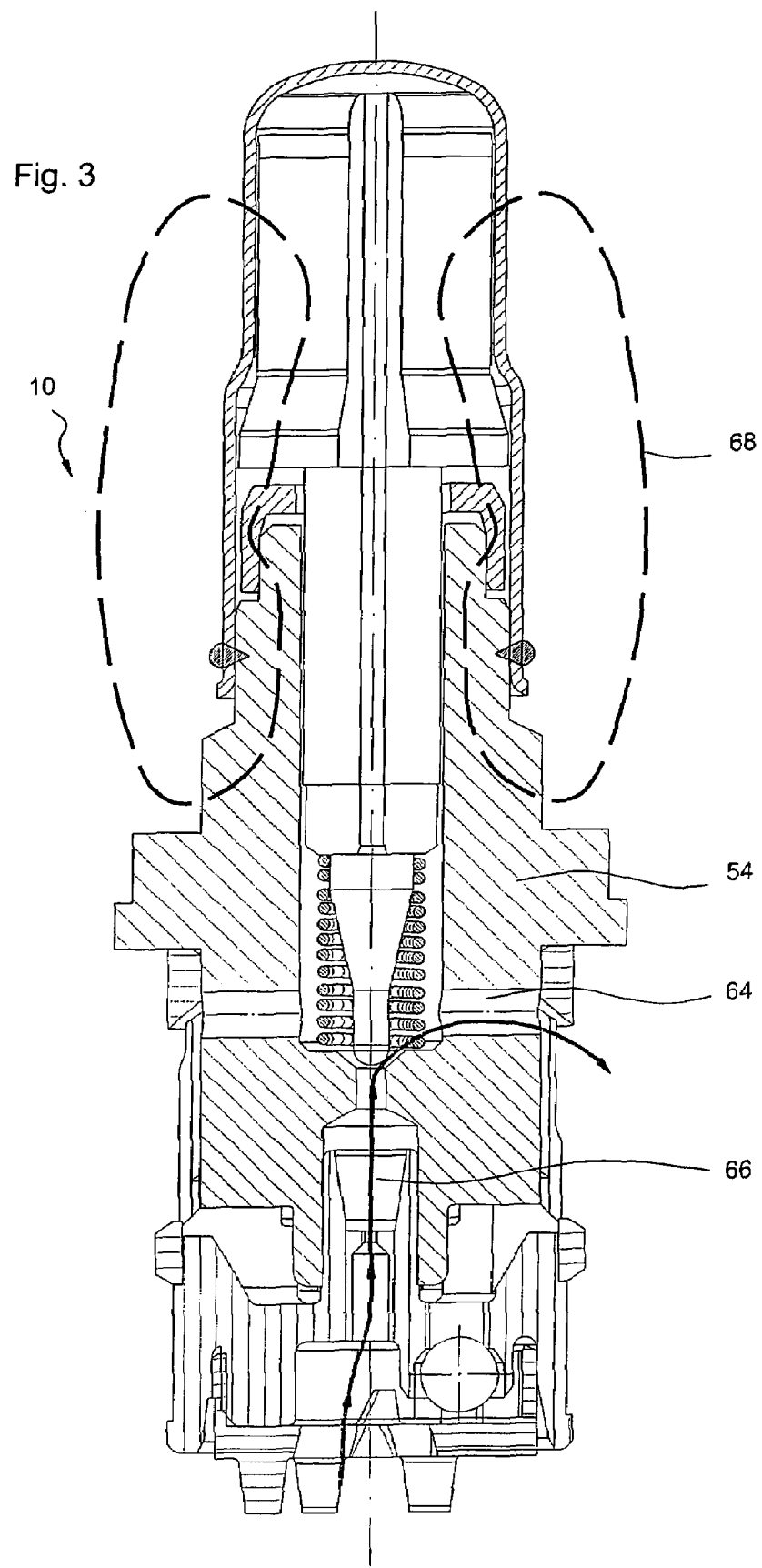
FIG. 3, a view of the magnetic flux and of the flow of the operating medium in the electromagnetic valve of the invention as shown in FIG. 2.

Besides these innovations, in the sealing seat-tappet guide component 54 of the valve 10 of FIG. 2, two or more diametrically opposed radial bores 64 are embodied above the conical-segment-shaped surface 26 of the sealing seat portion of the sealing seat-tappet guide component 54. An operating medium flowing through the sealing seat portion of the sealing seat-tappet guide component 54 can flow through these radial bores 64, deflected only twice at an angle of 90° each, to the radial filter 44 located on the outer jacket face of the tappet guide 12. In FIG. 3, this primary direction of the flow of the operating medium through the radial bores 64 is illustrated by an arrow 66.

In FIG. 3, the primary line 68 of the magnetic flux in or on the valve 10 of FIG. 2 is also shown. As can be seen, the magnetic flux passes from the tappet guide 12 radially toward a leg of the adjusting ring 56 of L-shaped cross section and from it axially into the armature 46. The cap 50 comprises material that conducts magnetic flux, and it closes the magnetic circuit between the sealing seat-tappet guide component 54 and the armature 46. An electric coil that generates the magnetic field or flux is not shown. It can be assumed that this coil is slipped onto the magnet valve and surrounds both the armature 46 and the tappet guide 12 as far as the collar 14.

In the valve 10 shown in FIGS. 2 and 3, the insert body 30 is designed precisely the same as that in FIG. 1, although the radial grooves 42 in the insert body 30 are no longer necessary and can therefore be omitted.

Figure 4:
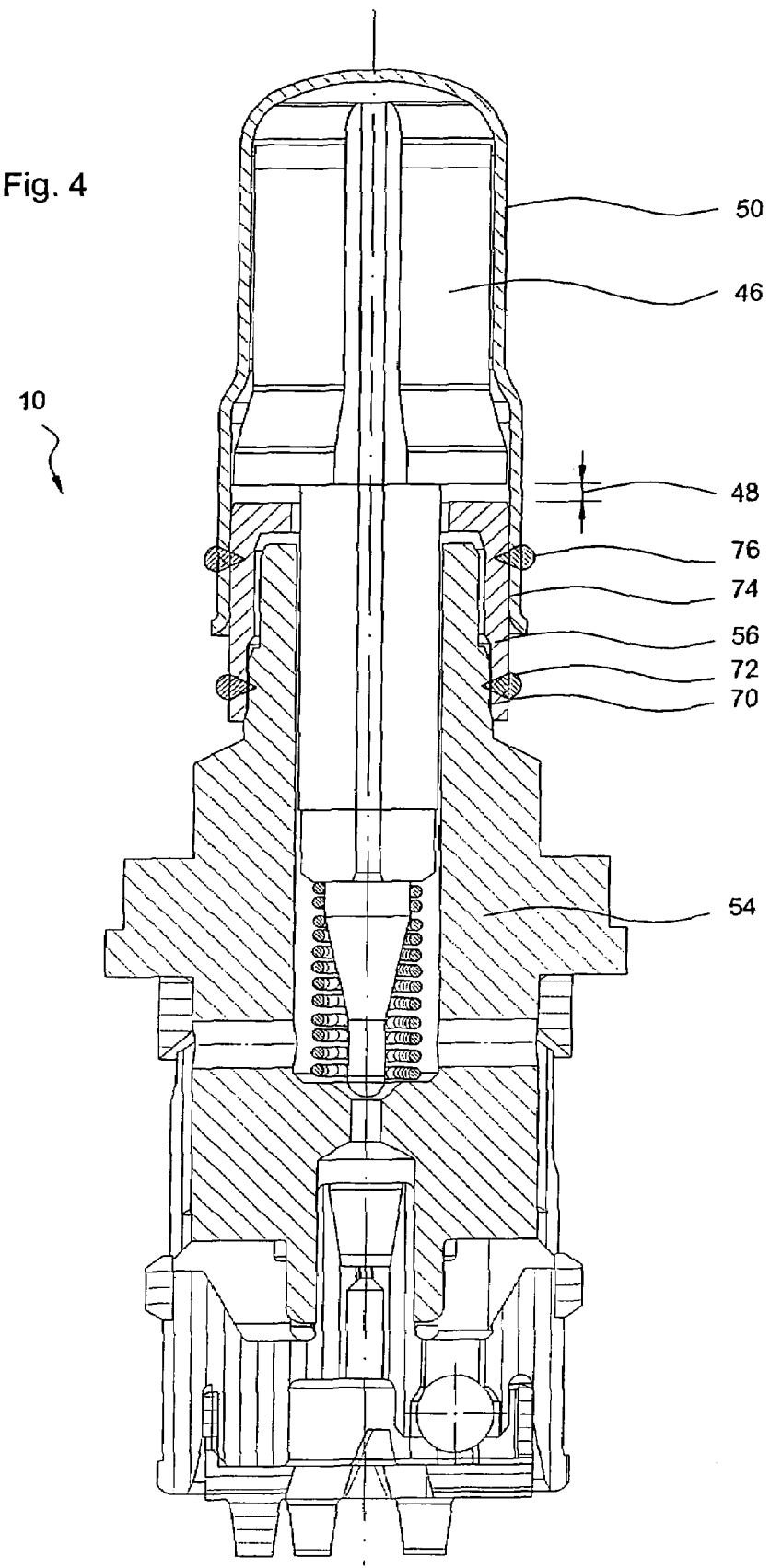
FIG. 4, a longitudinal section through a second exemplary embodiment of an electromagnetic valve of the invention.

In FIG. 4, a second exemplary embodiment of an electromagnetic valve 10 of the invention is shown, which in terms of the sealing seat-tappet guide component 54 and the one-piece design thus attained of the sealing seat and tappet guide is designed like the sealing seat-tappet guide component 54 shown in FIGS. 2 and 3.

However, in the region of the adjusting ring 56, the valve 10 of FIG. 4 is modified. Here the adjusting ring 56 is embodied as comparatively long in the longitudinal direction, and between the lower end region, in terms of FIG. 4, of the this long adjusting ring 56 and the upper end region of the sealing seat-tappet guide component 54, a radial compression 70 and an extensive laser-welded seam 72 are embodied. Onto the remaining jacket face of the long adjusting ring 56, the cap 50 is slipped onto the adjusting ring 56 at a radial compression 74 and then likewise fixed with a laser-welded seam 76; the two laser-welded seams 72 and 76 may be made in a single operation. Alternatively, the laser-welded seams 72 and 76 may be made in succession and possibly even at different work stations.

The foregoing relates to preferred exemplary embodiments of the invention, it being understood that other variants and embodiments thereof are possible within the spirit and scope of the invention, the latter being defined by the appended claims.

The invention claimed is:

1. In an electromagnetic valve, for a brake system of a motor vehicle, the valve comprising:
    an elongated tappet, which is guided axially displaceably in a tappet guide, the tappet having a sealing body embodied on the tappet, the tappet guide having a sealing seat against which the sealing body seals when said valve is in a closed position, wherein the sealing seat and the tappet guide are embodied in one piece;
    an armature mounted on said tappet at an opposing end from the sealing body of said tappet, and
    an adjusting device mounted directly on the tappet guide between a lower end face of the armature and the tappet guide, the adjusting device adjusting an air gap which is formed between an upper end face of the adjusting device and the lower end face of the armature, the air gap being adjusted in the axial direction by displacing a mounting position of said adjusting device on said tappet guide and fixing said adjusting device directly to said tappet guide, wherein adjustment of said adjustment device adjusts a stroke length of the tappet.

2. The electromagnetic valve in accordance with claim 1, wherein the tappet is guided displaceably in the tappet guide in such a way that the sealing body strikes the sealing seat centrally.

3. The electromagnetic valve in accordance with claim 1, wherein the adjusting device is an adjusting ring, which is disposed on the tappet guide.

4. The electromagnetic valve in accordance with claim 3, wherein the adjusting device is mounted on the tappet guide by means of a radial compression.

5. The electromagnetic valve in accordance with claim 3, wherein the adjusting device is fixed by means of a laser-welded seam on a substantially cylindrical jacket face of the tappet guide.

6. The electromagnetic valve in accordance with claim 3, further comprising a cap covering the tappet guide and the adjusting ring, and wherein the cap is fixed directly on the adjusting ring by means of a laser-welded seam.

7. The electromagnetic valve in accordance with claim 3, further comprising at least one radial through opening in the tappet guide in the region of the sealing seat though which bore a fluid flowing radially though the sealing seat can be carried away radially to the outside of the tappet guide.

8. The electromagnetic valve in accordance with claim 1, wherein the adjusting device is mounted on the tappet guide by means of a radial compression.

9. The electromagnetic valve in accordance with claim 8, wherein the adjusting device is fixed by means of a laser-welded seam on a substantially cylindrical jacket face of the tappet guide.

10. The electromagnetic valve in accordance with claim 8, further comprising a cap covering the tappet guide and the adjusting device, and wherein the cap is fixed directly on the adjusting device by means of a laser-welded seam.

11. The electromagnetic valve in accordance with claim 8, further comprising at least one radial through opening in the tappet guide in the region of the sealing seat through which bore a fluid flowing radially though the sealing seat can be carried away radially to the outside of the tappet guide.

12. The electromagnetic valve in accordance with claim 1, wherein the adjusting device is fixed by means of a laser-welded seam on a substantially cylindrical jacket face of the tappet guide.

13. The electromagnetic valve in accordance with claim 12, further comprising a cap covering the tappet guide and the adjusting device, and wherein the cap is fixed directly on the adjusting device by means of a laser-welded seam.

14. The electromagnetic valve in accordance with claim 1, further comprising a cap covering the tappet guide and the adjusting device, and wherein the cap is fixed directly on the adjusting device by means of a laser-welded seam.

15. The electromagnetic valve in accordance with claim 1, further comprising at least one radial through opening in the tappet guide in the region of the sealing seat through which bore a fluid flowing radially through the sealing seat can be carried away radially to the outside of the tappet guide.

* * * * *